US012681445B2

(12) United States Patent　　　　(10) Patent No.:　US 12,681,445 B2

Singhal et al.　　　　　　　　　　　(45) Date of Patent:　　　Jul. 14, 2026

(54) METHOD AND SYSTEM FOR HYBRID DATA AUGMENTATION FOR ESTIMATING PERFORMANCE DEGRADATION IN INDUSTRIAL PLANT

(71) Applicant: Tata Consultancy Services Limited, Mumbai (IN)

(72) Inventors: Tanmaya Singhal, Pune (IN); Anirudh Deodhar, Pune (IN); Vishal Sudam Jadhav, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 393 days.

(21) Appl. No.: 18/465,735

(22) Filed: Sep. 12, 2023

(65) Prior Publication Data

US 2024/0168444 A1　　May 23, 2024

(30) Foreign Application Priority Data

Nov. 21, 2022　　(IN) .............................. 202221066681

(51) Int. Cl.
　　　*G05B 13/04*　　　　　(2006.01)
(52) U.S. Cl.
　　　CPC ................................. *G05B 13/048* (2013.01)
(58) Field of Classification Search
　　　None
　　　See application file for complete search history.

(56) References Cited

U.S. PATENT DOCUMENTS

| | | | |
|---|---|---|---|
| 2019/0265685 A1* | 8/2019 | Lee | .................. G05B 19/41865 |
| 2020/0073994 A1 | 3/2020 | Guha et al. | |

(Continued)

FOREIGN PATENT DOCUMENTS

| | | | |
|---|---|---|---|
| CN | 114742599 A | 7/2022 | |
| WO | WO-2020234899 A2 * | 11/2020 | ............. G06Q 50/04 |

(Continued)

OTHER PUBLICATIONS

Merkt, "On the Use of Predictive Models for Improving the Quality of Industrial Maintenance: an Analytical Literature Review of Maintenance Strategies", 2019, Proceedings of the Federated Conference on Computer Science and Information Systems, pp. 693-704 (Year: 2019).*

(Continued)

*Primary Examiner* — David Earl Ogg

(74) *Attorney, Agent, or Firm* — Finnegan, Henderson, Farabow, Garrett & Dunner, LLP

(57)　　　　　　　　　ABSTRACT

This disclosure relates to a method and system for hybrid data augmentation for estimating performance degradation in industrial plant. Performance degradation in industrial plants cannot be measured by sensors or laboratory measurements and there are no methods to annotate performance degradation state. The embodiments of the present disclosure provide a knowledge-based data augmentation that use physics based information to model performance degradation. The disclosed method augments high fidelity data with knowledge-based methods into high and low confidence data which are used to calculate performance score of high confidence data. A physics-informed machine learning model is trained on high confidence data. The resulting model is then used to predict performance score for low confidence data. The model is further used for training prognostics and diagnostics models to predict and identify root causes responsible for performance degradation. The disclosed method is used for predicting ring formation inside the sponge iron kiln.

9 Claims, 6 Drawing Sheets

(56)           References Cited

U.S. PATENT DOCUMENTS

| | | | |
|---|---|---|---|
| 2020/0133248 A1* | 4/2020 | Sardeshmukh | G05B 13/04 |
| 2020/0285962 A1* | 9/2020 | Garcia Satorras | G05B 13/0265 |
| 2022/0237520 A1* | 7/2022 | Wang | G06N 20/00 |

FOREIGN PATENT DOCUMENTS

| | | | |
|---|---|---|---|
| WO | WO2022229975 A1 | 11/2020 | |
| WO | WO-2021019551 A1* | 2/2021 | G05B 13/04 |

OTHER PUBLICATIONS

Salim Sazzed et al. "SSentiA: A Self-supervised Sentiment Analyzer for classification from unlabeled data," Machine Learning with Applications, 2021, vol. 4, Elsevier Ltd., https://www.sciencedirect.com/science/article/pii/S2666827021000074.

Jafar Tanha et al. "Semi-supervised self-training for decision tree classifiers," International Journal of Machine Learning and Cybernetics, 2015, Springer, https://link.springer.com/article/10.1007/s13042-015-0328-7.

* cited by examiner

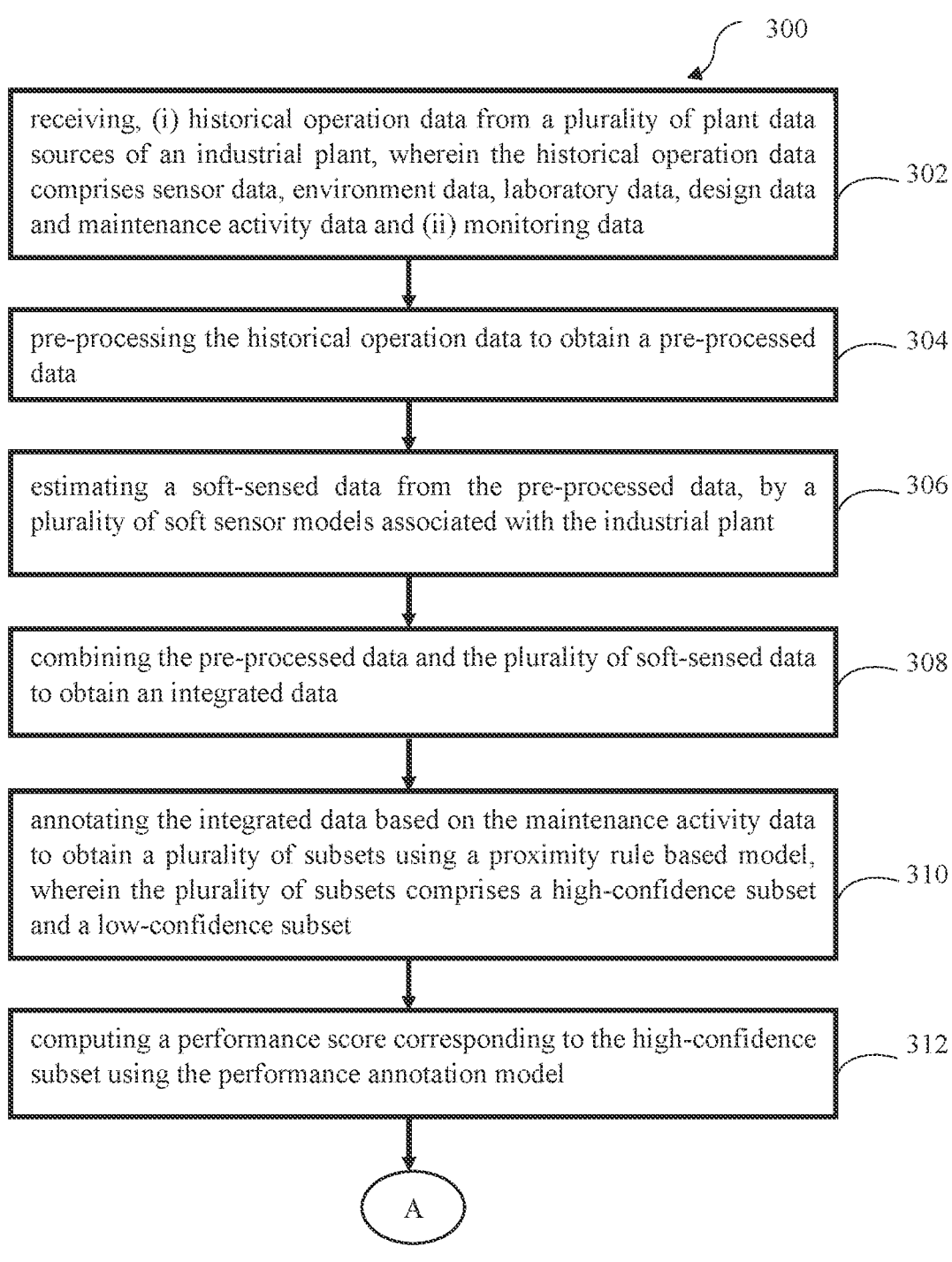

300 receiving, (i) historical operation data from a plurality of plant data sources of an industrial plant, wherein the historical operation data comprises sensor data, environment data, laboratory data, design data and maintenance activity data and (ii) monitoring data — 302 pre-processing the historical operation data to obtain a pre-processed data — 304 estimating a soft-sensed data from the pre-processed data, by a plurality of soft sensor models associated with the industrial plant — 306 combining the pre-processed data and the plurality of soft-sensed data to obtain an integrated data — 308 annotating the integrated data based on the maintenance activity data to obtain a plurality of subsets using a proximity rule based model, wherein the plurality of subsets comprises a high-confidence subset and a low-confidence subset — 310 computing a performance score corresponding to the high-confidence subset using the performance annotation model — 312

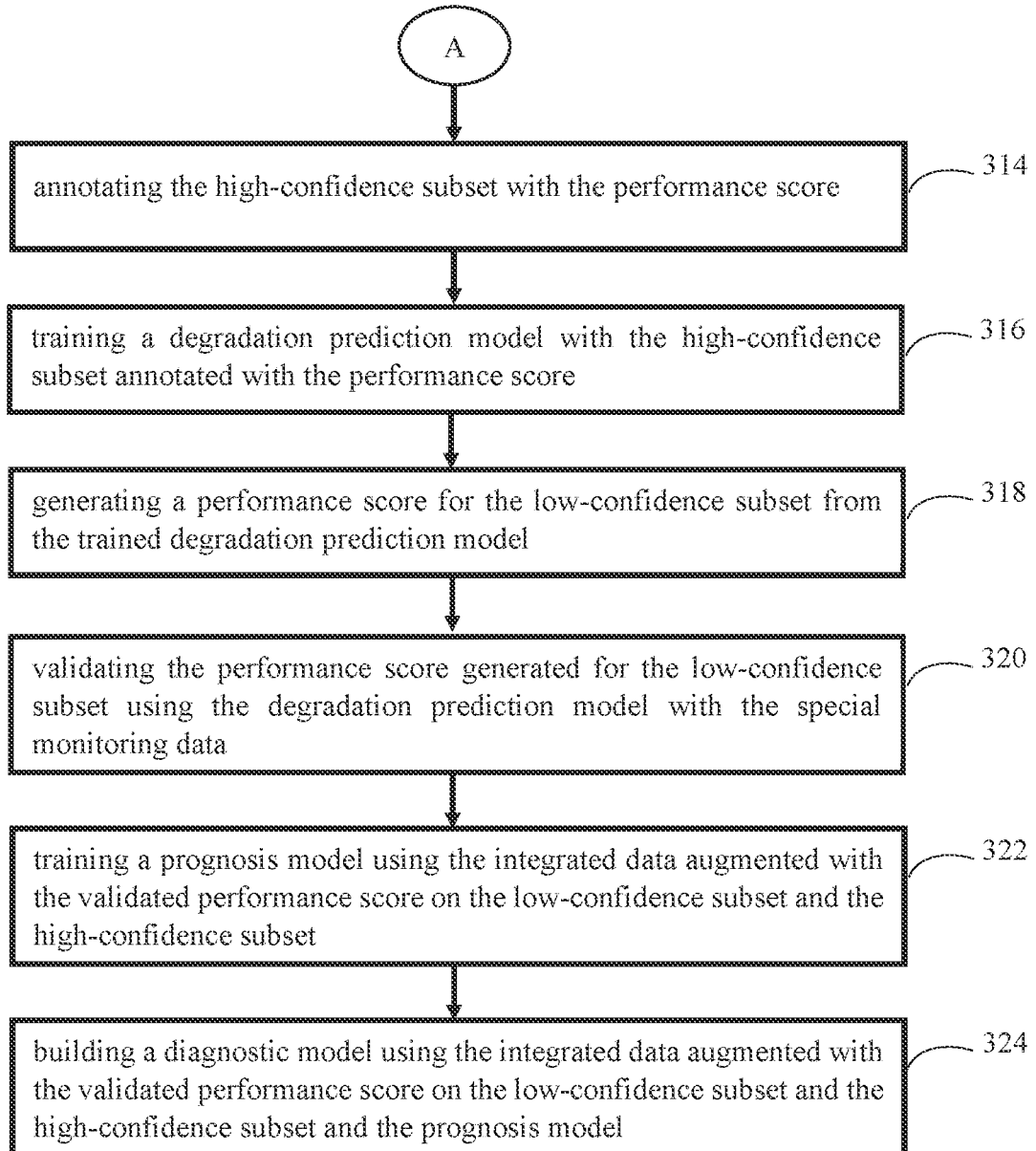

A annotating the high-confidence subset with the performance score     ~ 314 training a degradation prediction model with the high-confidence subset annotated with the performance score     ~ 316 generating a performance score for the low-confidence subset from the trained degradation prediction model     ~ 318 validating the performance score generated for the low-confidence subset using the degradation prediction model with the special monitoring data     ~ 320 training a prognosis model using the integrated data augmented with the validated performance score on the low-confidence subset and the high-confidence subset     ~ 322 building a diagnostic model using the integrated data augmented with the validated performance score on the low-confidence subset and the high-confidence subset and the prognosis model     ~ 324

FIG. 3B

METHOD AND SYSTEM FOR HYBRID DATA AUGMENTATION FOR ESTIMATING PERFORMANCE DEGRADATION IN INDUSTRIAL PLANT

PRIORITY CLAIM

This U.S. patent application claims priority under 35 U.S.C. § 119 to: Indian Patent Application No. 202221066681, filed on Nov. 21, 2022. The entire contents of the aforementioned application are incorporated herein by reference.

TECHNICAL FIELD

The disclosure herein generally relates to industrial data analysis, and, more particularly, to a method and system for hybrid data augmentation for estimating performance degradation in industrial plant.

BACKGROUND

Effective system performance monitoring is an important step towards predictive and prescriptive maintenance of industrial processes and equipment. Here, performance monitoring typically involves identification of key variables/sensors impacting the performance, computing single or plurality of metrics indicating system health (fault classification) and detecting the root cause/source of the performance degradation (causality or Root Cause Analysis (RCA)). In addition, prognostics of system performance is important as it gives plant operators and managers an opportunity to address the problem in real-time before the performance degradation can lead to catastrophic failure or shut down. For example, in sponge iron rotary kiln, accretion can lead to performance degradation and eventually shutdown for mechanical removal.

Reliable real-time monitoring and prognostics of system performance is not feasible for experts or plant with many process variables and complex relationship among them. There are also significant challenges in obtaining reliable estimates for system performance because of lack of ground-truth measurements and dynamic and non-linear nature of performance degradation phenomenon. There are two approaches to performance prognostics and diagnosis, namely knowledge-based and data-driven approaches. Knowledge-based methods (such as physics-based models for ring accretion) require a priori knowledge of process physics and the relationship between process variables and performance health indicators. While such knowledge can be derived from first principles understanding of the process, sources of domain knowledge and experience with the process, the initial effort required for this approach is significant and the gathered knowledge may not be exhaustive leading to inaccurate diagnostics in some cases. On the other hand, data-driven methods rely entirely on historical and current operating data. But lack of significant measurements can make it difficult to create reliable models for performance diagnostics.

Performance degradation in industrial plants often is not measured via sensors or laboratory measurements. For instance, the accretion in a sponge iron rotary kiln is a slow deposition of materials that cannot be easily observed by external sensors. In addition, even in the historical data (sensor, lab) stored in the plant systems, the obvious patterns are not visible in increase/decrease of deposition. Although the initial no accretion kiln and the subsequent high accretion kiln can be visually observed during the shutdowns, there is no method to annotate the gradually increasing accretion, which is largely a function of operating conditions and materials processed. Typical prognostic/diagnostic approaches fail to capture such unseen behavior and hence are not very effective.

SUMMARY

Embodiments of the present disclosure present technological improvements as solutions to one or more of the above-mentioned technical problems recognized by the inventors in conventional systems. For example, in one embodiment, a method for hybrid data augmentation for estimating performance degradation in industrial plant is provided. The method includes: receiving (i) historical operation data from a plurality of plant data sources of an industrial plant, wherein the historical operation data comprises sensor data, environment data, laboratory data, design data and maintenance activity data and (ii) monitoring data; pre-processing the historical operation data to obtain a pre-processed data; estimating a soft-sensed data from the pre-processed data, by a plurality of soft sensor models associated with the industrial plant, wherein the soft sensor models comprise at least one of (i) a plurality of knowledge-based models (ii) a plurality of data driven models and (iii) a plurality of physics-based models; combining the pre-processed data and the plurality of soft-sensed data to obtain an integrated data; annotating the integrated data based on the maintenance activity data to obtain a plurality of subsets using a proximity rule based model, wherein the plurality of subsets comprise a high-confidence subset and a low-confidence subset; computing a performance score corresponding to the high-confidence subset using a performance annotation model, wherein the performance annotation model comprises using at least one of (i) a rule based model and (ii) a physics-based model and wherein the performance score indicates a performance degradation state of the industrial plant; annotating the high-confidence subset with the performance score; training a degradation prediction model with the high-confidence subset annotated with the performance score, wherein the degradation prediction model comprises at least one of a first data-driven model and a first physics-informed machine learning model; generating a performance score for the low-confidence subset from the trained degradation prediction model; validating the performance score generated for the low-confidence subset using the degradation prediction model with the monitoring data; training a prognosis model using the integrated data augmented with the validated performance score on the low-confidence subset and the high-confidence subset, wherein the prognosis model comprises a second data-driven model or a second physics-informed machine learning model; building a diagnostic model using the integrated data augmented with the validated performance score on the low-confidence subset and the high-confidence subset and the prognosis model, wherein the diagnosis model comprises a third data-driven model.

In another aspect, a system for hybrid data augmentation for estimating performance degradation in industrial plant is provided. The system comprises memory storing instructions; one or more communication interfaces; and one or more hardware processors coupled to the memory via the one or more communication interfaces, wherein the one or more hardware processors are configured by the instructions to receive (i) historical operation data from a plurality of plant data sources of an industrial plant, wherein the historical operation data comprises sensor data, environment data, laboratory data, design data and maintenance activity data and (ii) monitoring data; pre-process the historical operation data to obtain a pre-processed data; estimating a soft-sensed data from the pre-processed data, by a plurality of soft sensor models associated with the industrial plant, wherein the soft sensor models comprise at least one of (i) a plurality of knowledge-based models (ii) a plurality of data driven models and (iii) a plurality of physics-based models; combine the pre-processed data and the plurality of soft-sensed data to obtain an integrated data; annotate the integrated data based on the maintenance activity data to obtain a plurality of subsets using a proximity rule based model, wherein the plurality of subsets comprise a high-confidence subset and a low-confidence subset; compute a performance score corresponding to the high-confidence subset using a performance annotation model, wherein the performance annotation model comprises using at least one of (i) a rule based model and (ii) a physics-based model and wherein the performance score indicates a performance degradation state of the industrial plant; annotate the high-confidence subset with the performance score; train a degradation prediction model with the high-confidence subset annotated with the performance score, wherein the degradation prediction model comprises at least one of a first data-driven model and a first physics-informed machine learning model; generate a performance score for the low-confidence subset from the trained degradation prediction model; validate the performance score generated for the low-confidence subset using the degradation prediction model with the monitoring data; train a prognosis model using the integrated data augmented with the validated performance score on the low-confidence subset and the high-confidence subset, wherein the prognosis model comprises a second data-driven model or a second physics-informed machine learning model; and build a diagnostic model using the integrated data augmented with the validated performance score on the low-confidence subset and the high-confidence subset and the prognosis model, wherein the diagnosis model comprises a third data-driven model.

In an embodiment, wherein the sensor data comprises temperature, pressure, concentration flow rates pertaining to the industrial plant, the environment data comprises humidity, ambient temperature in the vicinity of the industrial plant, the design data comprises dimensions, materials pertaining to the industrial plant, the maintenance activity data comprises dates, duration, maintenance action pertaining to the industrial plant, the laboratory data comprises chemical composition, size distribution, material properties pertaining to the industrial plant, and the monitoring data comprises visual inspection, camera images or videos, periodic laboratory samples, special monitoring tools pertaining to the industrial plant, wherein the monitoring data may be intermittent.

In an embodiment, wherein predicting an equipment performance degradation in the industrial plant using the trained prognosis model wherein by performing the steps of, receiving a real-time operation data from the plurality of plant data sources of the industrial plant; pre-processing the historical operation data and the real-time operation data to obtain a real-time pre-processed data; estimating a real-time soft-sensed data from the real-time pre-processed data, by the plurality of soft sensors associated with the industrial plant; combining the real-time pre-processed data and the real-time soft-sensed data to obtain a real-time integrated data; predicting a performance score corresponding to the real-time integrated data using the degradation prediction model; and predicting a future state of degradation from the real time integrated data and the performance score corresponding to the real time integrated data using the prognosis model; identifying a plurality of influential variables corresponding to the future state of degradation using the diagnosis model; and recommending a plurality of optimal setting for an optimal operation of the equipment using the plurality of influential variables.

In yet another aspect, there is provided a computer program product comprising a non-transitory computer readable medium having a computer readable program embodied therein, wherein the computer readable program, when executed on a computing device causes the computing device for hybrid data augmentation for estimating performance degradation in industrial plant by receiving (i) historical operation data from a plurality of plant data sources of an industrial plant, wherein the historical operation data comprises sensor data, environment data, laboratory data, design data and maintenance activity data and (ii) monitoring data; pre-processing the historical operation data to obtain a pre-processed data; estimating a soft-sensed data from the pre-processed data, by a plurality of soft sensor models associated with the industrial plant, wherein the soft sensor models comprise at least one of (i) a plurality of knowledge-based models (ii) a plurality of data driven models and (iii) a plurality of physics-based models; combining the pre-processed data and the plurality of soft-sensed data to obtain an integrated data; annotating the integrated data based on the maintenance activity data to obtain a plurality of subsets using a proximity rule based model, wherein the plurality of subsets comprise a high-confidence subset and a low-confidence subset; computing a performance score corresponding to the high-confidence subset using a performance annotation model, wherein the performance annotation model comprises using at least one of (i) a rule based model and (ii) a physics-based model and wherein the performance score indicates a performance degradation state of the industrial plant; annotating the high-confidence subset with the performance score; training a degradation prediction model with the high-confidence subset annotated with the performance score, wherein the degradation prediction model comprises at least one of a first data-driven model and a first physics-informed machine learning model; generating a performance score for the low-confidence subset from the trained degradation prediction model; validating the performance score generated for the low-confidence subset using the degradation prediction model with the monitoring data; training a prognosis model using the integrated data augmented with the validated performance score on the low-confidence subset and the high-confidence subset, wherein the prognosis model comprises a second data-driven model or a second physics-informed machine learning model; building a diagnostic model using the integrated data augmented with the validated performance score on the low-confidence subset and the high-confidence subset and the prognosis model, wherein the diagnosis model comprises a third data-driven model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is an exemplary flow diagram depicting steps of the method for hybrid data augmentation for estimating performance degradation in industrial plant with some embodiments of the present disclosure.

DETAILED DESCRIPTION

Figure 1:
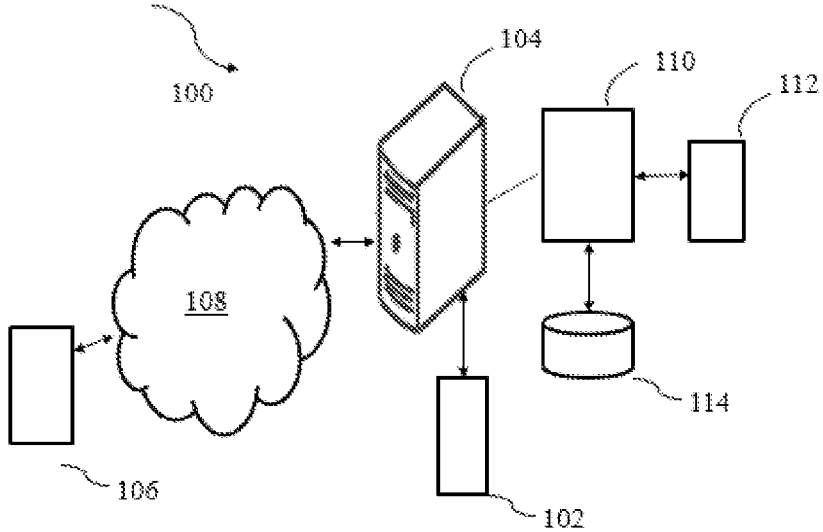
FIG. 1 illustrates an exemplary block diagram of a system configured to perform hybrid data augmentation for estimating performance degradation in industrial plant according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Although techniques for performance monitoring in industrial plants are available in literature, their applicability in scenarios with sparsely measured performance indicators is unreliable. Lack of sensor data or lab tested information is common in many use cases like lime kiln, sponge iron kiln, air pre-heater, catalyst degradation etc. Most of the time performance monitoring is done either by modelling auxiliary variables or using some empirical or physics-based model for measuring system performance from process variables. However, such systems are found to be less accurate and are generally low fidelity.

The embodiments of the present disclosure describes a hybrid knowledge-based data driven approach for estimating performance degradation in industrial plant where a knowledge-based estimation of system performance is used to create a data-driven model. This involves classifying data based on its fidelity to knowledge algorithms and using high-fidelity subset for data generation for data-driven model. The disclosed method augments high fidelity data-driven approach with knowledge-based algorithms which are used to calculate performance score on high confidence data. The disclosed method utilizes good prediction capability of data-driven models as well as low data requirement of knowledge-based systems.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

Figure 2:
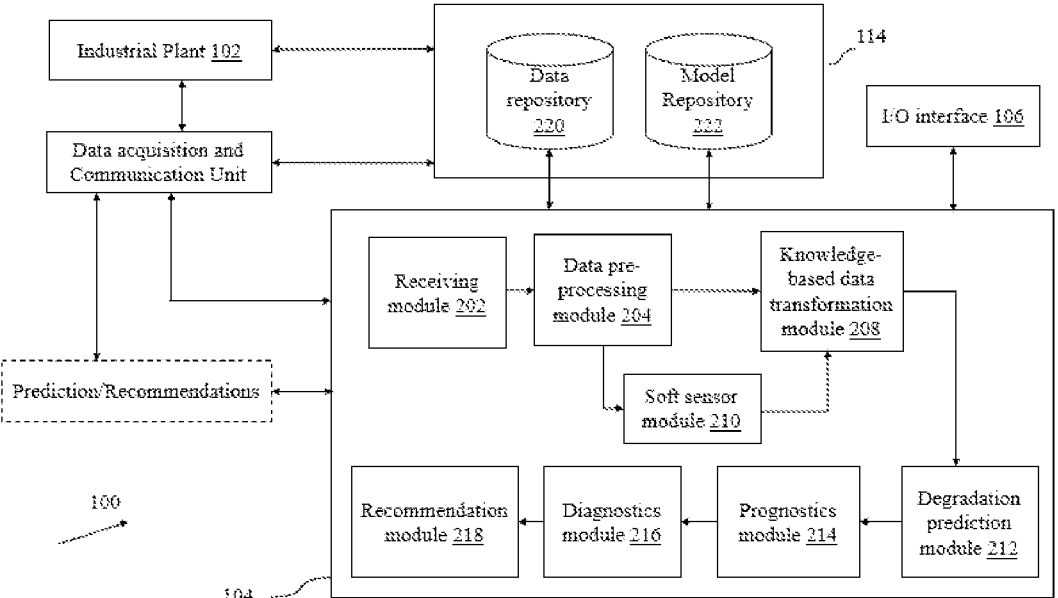
FIG. 2 illustrates a digital twin architecture representing the system of FIG. 1 for hybrid data augmentation for estimating performance degradation in industrial plant according to some embodiments of the present disclosure.

FIG. 1 illustrates an exemplary block diagram of a system 100 configured to perform hybrid data augmentation for estimating performance degradation in industrial plant 102, according to some embodiments of the present disclosure. FIG. 2 illustrates a digital twin architecture representing the system of FIG. 1 for hybrid data augmentation for estimating performance degradation in industrial plant according to some embodiments of the present disclosure. The system 100 provides a digital twin that can mimic the performance of the industrial plant 102 in real-time. Although the present disclosure is explained considering that the system 100 is implemented on a server, it may also be present elsewhere such as an on premise machine or a cloud. It may be understood that the system 100 comprises one or more computing devices 104, such as a laptop computer, a desktop computer, a notebook, a workstation, a cloud-based computing environment and the like. It will be understood that the system 100 may be accessed through one or more input/output interfaces collectively referred to as I/O interface 106. Examples of the I/O interface 106 may include, but are not limited to, a user interface, a portable computer, a personal digital assistant, a handheld device, a smartphone, a tablet computer, a workstation, and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

The system 100 may be implemented in a workstation, a mainframe computer, a server, and a network server. In an embodiment, the computing device 104 further comprises one or more hardware processors 110, one or more memory 112, hereinafter referred as a memory 112 and a data repository 114, for example, a repository 114 or a database 114. The memory 112 is in communication with the one or more hardware processors 110, wherein the one or more hardware processors 110 are configured to execute programmed instructions stored in the memory 112, to perform various functions as explained in the later part of the disclosure. The repository 114 may store data processed, received, and generated by the system 100 and comprises a data repository 220 and a model repository 222.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 illustrates a digital twin architecture representing the system of FIG. 1 for hybrid data augmentation for estimating performance degradation in industrial plant according to some embodiments of the present disclosure. The system 100 comprises a plurality of modules for performing various function. It comprises a receiving module 202, a data pre-processing module 204, a knowledge-based data transformation module 208, a soft sensor module 210, a degradation prediction module 212, a prognostics module 214, a diagnostics module 216, a recommendation module 218, a data repository 220 and a model repository 222. The functionality of each module will be explained in detail in conjunction with the steps in the flow diagram as depicted in FIG. 3A through FIG. 4B.

FIG. 3A and FIG. 3B is an exemplary flow diagram depicting steps of the method for hybrid data augmentation for estimating performance degradation in industrial plant with some embodiments of the present disclosure.

In an embodiment, the system 100 comprises one or more data storage devices or the memory 112 operatively coupled to the processor(s) 110 and is configured to store instructions for execution of steps of the method 300 by the processor(s) or one or more hardware processors 110. The steps of the method 300 of the present disclosure will now be explained with reference to the components or blocks of the system 100 as depicted in FIG. 1 and the steps of flow diagram as depicted in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302, the one or more processors 110 are config- ured to receive by the receiving module 202, (i) historical operation data from a plurality of plant data sources of an industrial plant, wherein the historical operation data com- prises sensor data, environment data, laboratory data, design data and maintenance activity data and (ii) monitoring data using the data acquisition and communication unit. The sensor data comprises temperature, pressure, concentration flow rates from processes and equipment in units of the industrial plant. The sensor data is obtained from a distrib- uted control system (DCS), OPC server, etc. and is stored in an operational database inside the data repository 220. The environment data comprises humidity, ambient temperature in the vicinity of the industrial plant which is recorded by the plurality of physical sensors and is stored in an environment database inside the data repository 220. The design data comprises dimensions, materials pertaining to the industrial plant and the maintenance activity data comprises dates, duration, maintenance action and information related to the condition of the process and equipment, plant running status, maintenance activities performed on the plant units, etc. which is stored and retrieved from a maintenance database. The laboratory data comprises chemical composition, size distribution, material properties pertaining to the industrial plant that are tested at the laboratory. The laboratory data is typically stored and retrieved from a laboratory information management system (LIMS), relational database (RDB) or SQL database inside the data repository 220. The monitoring data comprises visual inspection, camera images or videos, periodic laboratory samples and special monitoring tools pertaining to the industrial plant, wherein this data could be monitored only periodically and not continuously measured.

At step 304, the one or more processors 110 are config- ured to pre-process by the data pre-processing module 204, the historical operation data to obtain a pre-processed data. The historical operation data is merged from various data- bases of the plant such as the environment database, the operation database, the maintenance database and so on if needed. This collected data may not be in the required formats. This data is verified for noise, missing, unreal values in the data. In the data pre-processing module 204 noisy data and unreal values in data are eliminated. Some- times frequency of the received time series data in not consistent and is non-uniformly sampled. This non-uni- formly sampled data is processed and brought to uniform sampling frequency. Missing values of the data are com- pensated by imputing or smoothening to clean the data.

At step 306, the one or more processors 110 are config- ured to estimate a soft-sensed data from the pre-processed data, by a plurality of soft sensor models in the soft sensor module 210 associated with the industrial plant. The soft sensor models comprise using at least one of (i) a plurality of knowledge-based models (ii) a plurality of data driven models and (iii) a plurality of physics-based models, and the soft-sensed data comprises a plurality of soft-sensed condi- tion pertaining to the industrial plant. The soft-sensed data is a simulated data that cannot be obtained directly from physical sensors but can be inferred from the physical sensors. In certain cases, the direct use of physical sensors may not be possible in some particular applications or environments due to constraints such as access require- ments, inflexible or disturbances in environment, limitations of the sensors. Therefore, soft sensors are used to estimate process parameters. Soft sensor models for each industrial plant are built using physics-based models, machine learn- ing or deep learning techniques or knowledge-based models and stored in a soft sensor database. Examples of physics- based models comprise numerical solutions solving heat and mass conservation over the domain based on finite volume methods. Such models may predict unmeasured quantities in the equipment/process, such as internal temperatures, con- centrations and depositions.

At step 308, the one or more processors 110 are config- ured to combine the pre-processed data and the plurality of soft-sensed data to obtain an integrated data.

At step 310, the one or more processors 110 are config- ured to annotate the integrated data based on the mainte- nance activity data to obtain a plurality of subsets using a proximity rule based model. The plurality of subsets com- prises a high-confidence subset and a low-confidence subset. The integrated data is annotated into various subsets using the knowledge-based data transformation module 208, which utilizes the maintenance activity data. The proximity rule based model is utilized for annotating the integrated data into the high-confidence subset and the low-confidence subset. The proximity rule indicates analyzing a proximity of a pre-defined operating window of length l to an action taken for the maintenance activity with respect to the equipment(s). For example, cleaning the equipment, replac- ing the equipment and so on. The data inside the operating window which is adjacent to the maintenance activity is annotated as high-confidence while the rest of the data is annotated as low-confidence. The amount of data annotated as high-confidence or low-confidence depends on the win- dow length.

For example, the maintenance activity for a sponge iron kiln involves multiple activities such as shutting down the kiln and replacing components, mechanical cleaning of the accretion. The proximity rule based model uses a window of length l=10 days just before and after the maintenance activity that involves cleaning of the accretion. All the data in these windows is annotated as high confidence data, since the state of accretion is relatively well known as compared to the rest of the data away from the maintenance period. The proximity and the length of the window depends upon the equipment and the dynamics of the degradation. For a faster degradation, smaller window is chosen and for a slower degradation, a longer window can be chosen.

At step 312, the one or more processors 110 are configured to compute a performance score corresponding to the high-confidence subset using a performance annotation model. The performance annotation model comprises using at least one of (i) a rule based model and (ii) a physics-based model. The performance score indicates a performance degradation state of the industrial plant. For example, intensity of accretion in sponge iron kiln, extent of fouling in heat exchanger. The performance score computation using the performance annotation model is based on the maintenance activity data and the soft-sensed data. The typical range of the performance score is between the values 0 and 1, wherein the value 0 indicates a low performance score and the value 1 indicates a high performance score. In accordance with the rule based model, the performance score is assigned based on the position of data associated with the high confidence dataset with regards to the maintenance activity. A high performance score of 1 is assigned to the data just after the maintenance activity and a low performance score of 0 is assigned just before the maintenance activity. Depending on the use case, the performance annotation model for performance score computation may be a rule based model or a physics-based model.

For instance, in a sponge iron rotary kiln, the data over window l, after the maintenance is annotated as 1 (high performance) since it is free from accretion. On the other hand, the data over window l, before the maintenance activity is annotated as 0 (low performance) as the shutdown was needed to remove accretion which was affecting the performance. Similarly, the annotation could be done based on physics-based models. For instance, in a sponge iron rotary kiln, similar annotations can be achieved by using a physics-based model that predicts the internal temperature profile in the two windows, which is then used to calculate the performance score of each window. Alternatively, any manual inspection done and recorded intermittently can also be used a high confidence high/low performance annotation.

At step 314, the one or more processors 110 are configured to annotate the high-confidence subset with the performance score.

At step 316, the one or more processors 110 are configured to train a degradation prediction model with the high-confidence subset annotated with the performance score, wherein the degradation prediction model comprises at least one of a first data-driven model or a first physics-informed machine learning model in the degradation prediction module 212.

For instance, the degradation prediction model comprises a machine learning regression/classification model that is trained to predict the performance score probability as a function of the sensor and laboratory data (from the integrated data). This model can be trained based only on the high confidence performance labeled data obtained in step 314. Alternatively, a physics informed machine learning model such as a physics informed neural network (PINN) can be used as the degradation prediction model.

At step 318, the one or more processors 110 are configured to generate a performance score for the low-confidence subset from the trained degradation prediction model.

At step 320, the one or more processors 110 are configured to validate the performance score generated for the low-confidence subset using the degradation prediction model with the monitoring data. If the prediction is validated, the degradation prediction model is stored in the model repository 222, from where it can be used as performance score generator to train prognostics and diagnostics models.

The monitoring data comprises intermittently available data such as data from manual inspection, visual evidence, Infrared (IR)/actual camera images of the degradation. For instance, in a sponge iron rotary kiln, periodic camera images of accretion could be obtained by temporarily shutting down or cooling down the kiln. Such images can then be used to validate the performance score during the inspection period. Similarly, periodic laboratory measurements could be done on the samples of materials to check the composition and size distribution, which is then used to validate the performance score predicted by the performance degradation model. If the validation is not obtained, the performance score predicted on the low confidence data is flagged as not validated and used with warning provided to the operator/user.

At step 322, the one or more processors 110 are configured to train a prognosis model using the integrated data augmented with the validated performance score on the low-confidence subset and the high-confidence subset, wherein the prognosis model comprises a second data-driven model or a second physics-informed machine learning model in the prognostics module 214. For instance, the prognostics models could use technique such as Long short term memory or convolution neural networks. In another embodiment, the prognostics models could use physics-informed deep learning techniques for forecasting and predictions.

At step 324, the one or more processors 110 are configured to build a diagnostic model using the integrated data augmented with the validated performance score on the low-confidence subset and the high-confidence subset and the prognosis model, wherein the diagnosis model comprises a third data-driven model in the diagnostics module 216. The diagnostic model could be a set of techniques like Shapley analysis or Failure mode analysis trees.

The steps 302 to 324 of the FIG. 3A and FIG. 3B are explained further with an example of sponge iron kiln. Sponge iron kilns are used to reduce iron ore suffer from accretion inside the ring. The historical operation data is pre-processed, and a soft-sensor model based on physics-informed neural networks is used to generate a temperature profile for the whole kiln, and a temperature fluctuation model to approximate accretion location. The mechanical accretion removal information from the data repository 220 is used to classify data into high and low confidence subsets, where high confidence subset represents time steps where accretion formation status is certain, while low confidence subset are regions where no estimate for accretion is available. High confidence subset is defined as 10% of cycle length at the start and end of the cycle before and after mechanical removal, where before mechanical removal is annotated with highest accretion probability (1) and after mechanical removal is annotated with lowest accretion probability (0). A cycle is the operation period between two successive maintenance periods. A performance score for accretion formation which represents probability of accretion inside the kiln is introduced. In accordance with the kiln operation, the performance score is assigned as 1 just after the maintenance activity and 0 just before the maintenance shutdown for appropriate time window length in high confidence subsets.

Another method for annotating with performance score is utilizing physics-based models or physics informed neural networks which can soft sense accretion. Accretion phenomenon is heavily associated with temperature fluctuations and pressure drop inside kiln. Assuming the model performs well in high-confidence region, the accretion score a can be calculated as $$a = \mathcal{F}_{(T,P,G)}$$

where G is any other soft-sensor or operation data that is needed by accretion prediction model $\mathcal{F}$.

This annotated data with accretion formation labels is then used to train a degradation prediction long short-term memory network (LSTM) model, which outputs accretion formation probability. This degradation prediction model is then used to generate a probability estimate for low confidence dataset. To validate the performance score for the low confidence subset, sample data in form of images inside kiln at some select intervals are taken. The accretion formation data generated for both high and low confidence subsets is then used to train prognostics model to forecast system performance.

Figure 4A:
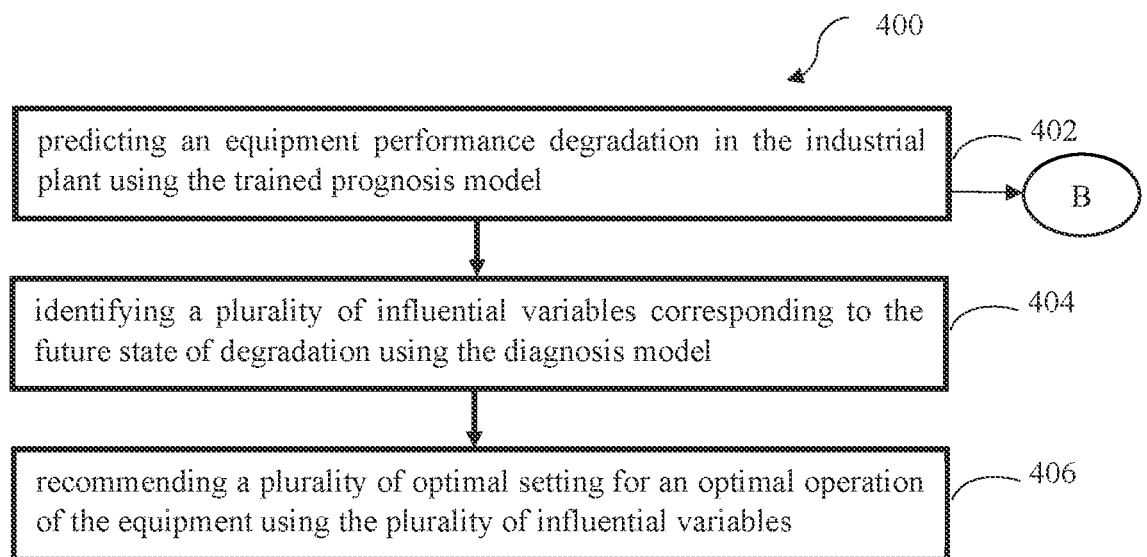
FIG. 4A and FIG. 4B is an exemplary flow diagram depicting steps for estimating performance degradation in industrial plant using a trained degradation prediction model according to some embodiments of the present disclosure.
Figure 4B:
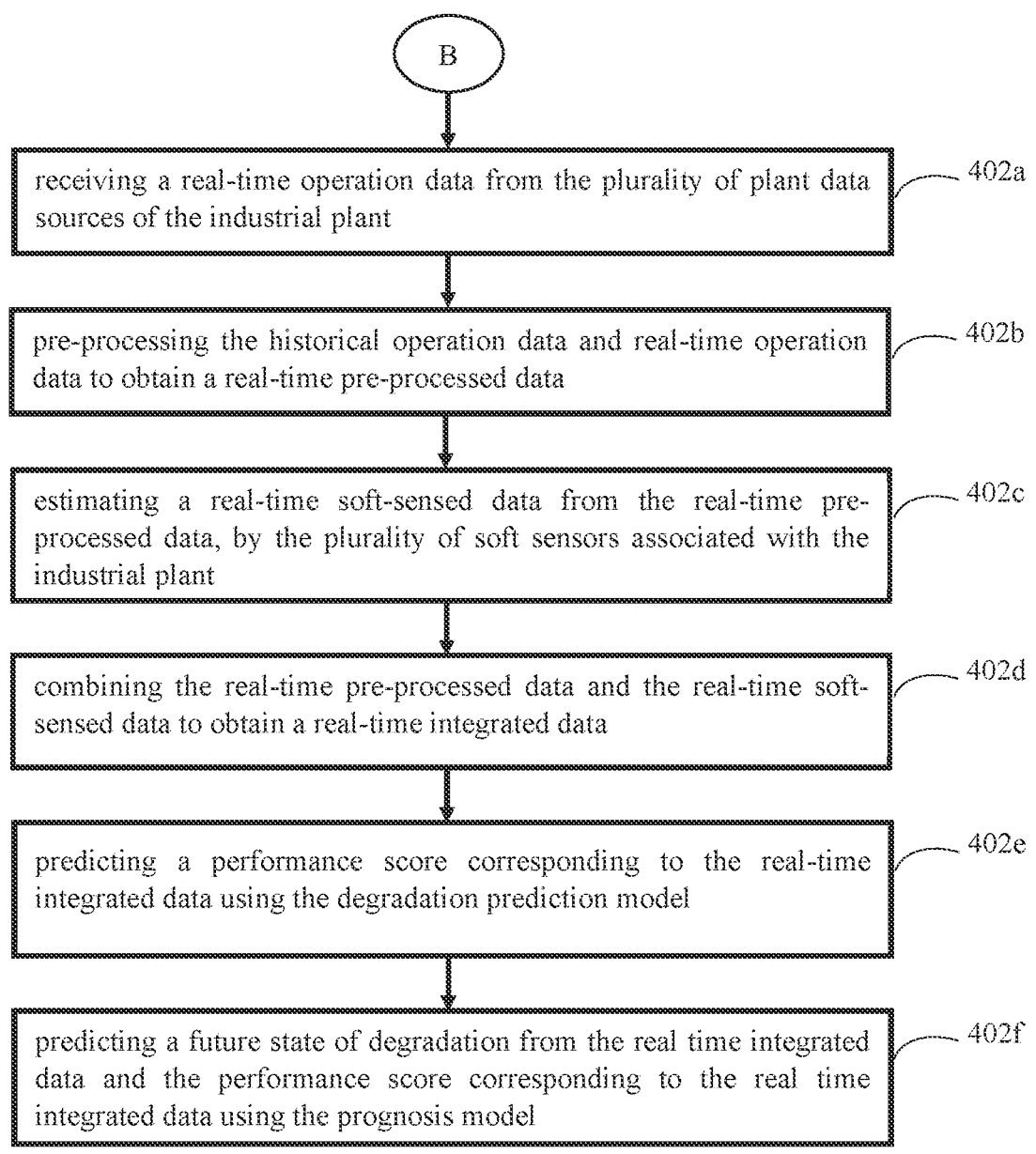

FIG. 4A and FIG. 4B is an exemplary flow diagram depicting the steps for estimating performance degradation in industrial plant using the trained degradation prediction model according to some embodiments of the present disclosure.

At step 402, the one or more processors 110 are configured to predict an equipment performance degradation in the industrial plant using the trained prognosis model. The prediction of an equipment performance degradation in the industrial plant using the trained prognosis model is further explained using the steps in FIG. 4B. At step 402a, the one or more processors 102 are configured to receive a real-time operation data from the plurality of plant data sources of the industrial plant.

At step 402b, the one or more processors 102 are configured to pre-process the historical operation data and the real-time operation data to obtain a real-time pre-processed data. Further at step 402c, the one or more processors 110 are configured to estimate a real-time soft-sensed data from the real-time pre-processed data, by the plurality of soft sensors associated with the industrial plant. At step 402d, the one or more processors 110 are configured to combine the real-time pre-processed data and the real-time soft-sensed data to obtain a real-time integrated data. At step 402e, the one or more processors 110 are configured to predict a performance score corresponding to the real-time integrated data using the degradation prediction model. And at step 402f, the one or more processors 110 are configured to predict a future state of degradation from the real time integrated data and the performance score corresponding to the real time integrated data using the prognosis model.

At step 404, the one or more processors 110 are configured to identify a plurality of influential variables corresponding to the future state of degradation using the diagnosis model.

At step 406, the one or more processors 110 are configured to recommend a plurality of optimal setting for an optimal operation of the equipment using the plurality of influential variables by the recommendation module 218.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of real time performance degradation monitoring and diagnosis of equipment or process in the industrial plant. The embodiments, provides a knowledge-based data augmentation method that uses physics based information to model performance degradation. This model is then used to augment data-driven or physics-informed machine learning and deep learning techniques for performance monitoring and prognostics.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, via one or more hardware processors, (i) historical operation data from a plurality of plant data sources of an industrial plant, wherein the historical operation data comprises sensor data, environment data, laboratory data, design data and maintenance activity data and (ii) monitoring data;

pre-processing, via the one or more hardware processors, the historical operation data to obtain a pre-processed data;

estimating, via the one or more hardware processors, a soft-sensed data from the pre-processed data, by a plurality of soft sensor models associated with the industrial plant, wherein the soft sensor models comprise at least one of (i) a plurality of knowledge-based models (ii) a plurality of data driven models and (iii) a plurality of physics-based models;

combining, via the one or more hardware processors, the pre-processed data and the plurality of soft-sensed data to obtain an integrated data;

annotating, via the one or more hardware processors, the integrated data based on the maintenance activity data to obtain a plurality of subsets using a proximity rule based model, wherein the plurality of subsets comprise a high-confidence subset and a low-confidence subset;

computing, via the one or more hardware processors, a performance score corresponding to the high-confidence subset using a performance annotation model, wherein the performance annotation model comprises using at least one of (i) a rule based model and (ii) a physics-based model and wherein the performance score indicates a performance degradation state of the industrial plant;

annotating, via the one or more hardware processors, the high-confidence subset with the performance score;

training, via the one or more hardware processors, a degradation prediction model with the high-confidence subset annotated with the performance score, wherein the degradation prediction model comprises at least one of a first data-driven model and a first physics-informed machine learning model;

generating, via the one or more hardware processors, a performance score for the low-confidence subset from the degradation prediction model;

validating, via the one or more hardware processors, the performance score generated for the low-confidence subset using the degradation prediction model with the monitoring data;

training, via the one or more hardware processors, a prognosis model using the integrated data augmented with the validated performance score on the low-confidence subset and the high-confidence subset, wherein the prognosis model comprises a second data-driven model or a second physics-informed machine learning model; and building, via the one or more hardware processors, a diagnostic model using the integrated data augmented with the validated performance score on the low-confidence subset and the high-confidence subset and the prognosis model, wherein the diagnostic model comprises a third data-driven model.

2. The method of claim 1, wherein the sensor data comprises temperature, pressure, concentration flow rates pertaining to the industrial plant, the environment data comprises humidity, ambient temperature in the vicinity of the industrial plant, the design data comprises dimensions, materials pertaining to the industrial plant, the maintenance activity data comprises dates, duration, maintenance action pertaining to the industrial plant, the laboratory data comprises chemical composition, size distribution, material properties pertaining to the industrial plant, and the monitoring data comprises visual inspection, camera images or videos, periodic laboratory samples, special monitoring tools pertaining to the industrial plant, wherein the monitoring data may be intermittent.

3. The method of claim 1, further comprising:

predicting, via the one or more hardware processors, an equipment performance degradation in the industrial plant using the prognosis model by performing the steps of, receiving, via the one or more hardware processors, a real-time operation data from the plurality of plant data sources of the industrial plant;

pre-processing, via the one or more hardware processors, the historical operation data and the real-time operation data to obtain a real-time pre-processed data;

estimating, via the one or more hardware processors, a real-time soft-sensed data from the real-time pre-processed data, by the plurality of soft sensors associated with the industrial plant;

combining, via the one or more hardware processors, the real-time pre-processed data and the real-time soft-sensed data to obtain a real-time integrated data;

predicting, via the one or more hardware processors, a performance score corresponding to the real-time integrated data using the degradation prediction model; and predicting, via the one or more hardware processors, a future state of degradation from the real time integrated data and the performance score corresponding to the real time integrated data using the prognosis model;

identifying, via the one or more hardware processors, a plurality of influential variables corresponding to the future state of degradation using the diagnostic model; and recommending, via the one or more hardware processors, a plurality of optimal setting for an optimal operation of the equipment using the plurality of influential variables.

4. A system, comprising:

a memory storing instructions;

one or more communication interfaces; and one or more hardware processors coupled to the memory via the one or more communication interfaces, wherein the one or more hardware processors are configured by the instructions to:

receive (i) historical operation data from a plurality of plant data sources of an industrial plant, wherein the historical operation data comprises sensor data, environment data, laboratory data, design data and maintenance activity data and (ii) monitoring data;

pre-process the historical operation data to obtain a pre-processed data;

estimate a soft-sensed data from the pre-processed data, by a plurality of soft sensor models associated with the industrial plant, wherein the soft sensor models comprise using at least one of (i) a plurality of knowledge-based models (ii) a plurality of data driven models and (iii) a plurality of physics-based models;

combine the pre-processed data and the plurality of soft-sensed data to obtain an integrated data;

annotate the integrated data based on the maintenance activity data to obtain a plurality of subsets using a proximity rule based model, wherein the plurality of subsets comprises a high-confidence subset and a low-confidence subset;

compute a performance score corresponding to the high-confidence subset using a performance annotation model, wherein the performance annotation model comprises using at least one of (i) a rule based model and (ii) a physics-based model and wherein the performance score indicates a performance degradation state of the industrial plant;

annotate the high-confidence subset with the performance score;

train a degradation prediction model with the high-confidence subset annotated with the performance score, wherein the degradation prediction model comprises at least one of a first data-driven model or a first physics-informed machine learning model;

generate a performance score for the low-confidence subset from the degradation prediction model;

validate the performance score generated for the low-confidence subset using the degradation prediction model with the monitoring data;

train a prognosis model using the integrated data augmented with the validated performance score on the low-confidence subset and the high-confidence subset, wherein the prognosis model comprises a second data-driven model or a second physics-informed machine learning model; and build a diagnostic model using the integrated data augmented with the validated performance score on the low-confidence subset and the high-confidence subset and the prognosis model, wherein the diagnostic model comprises a third data-driven model.

5. The system of claim 4, wherein the sensor data comprises temperature, pressure, concentration flow rates pertaining to the industrial plant, the environment data comprises humidity, ambient temperature in the vicinity of the industrial plant, the design data comprises dimensions, materials pertaining to the industrial plant, the maintenance activity data comprises dates, duration, maintenance action pertaining to the industrial plant, the laboratory data comprises chemical composition, size distribution, material properties pertaining to the industrial plant, and the monitoring data comprises visual inspection, camera images or videos, periodic laboratory samples, special monitoring tools pertaining to the industrial plant, wherein the monitoring data may be intermittent.

6. The system of claim 4, further comprising:

predict an equipment performance degradation in the industrial plant using the prognosis model wherein the step comprises, receive a real-time operation data from the plurality of plant data sources of the industrial plant;

pre-process the historical operation data and the real-time operation data to obtain a real-time pre-processed data;

estimate a real-time soft-sensed data from the real-time pre-processed data, by the plurality of soft sensors associated with the industrial plant;

combine the real-time pre-processed data and the real-time soft-sensed data to obtain a real-time integrated data;

predict a performance score corresponding to the real-time integrated data using the degradation prediction model; and predict a future state of degradation from the real time integrated data and the performance score corresponding to the real time integrated data using the prognosis model;

identify a plurality of influential variables corresponding to the future state of degradation using the diagnostic model; and recommend a plurality of optimal setting for an optimal operation of the equipment using the plurality of influential variables.

7. One or more non-transitory machine-readable information storage mediums comprising one or more instructions which when executed by one or more hardware processors cause:

receiving, (i) historical operation data from a plurality of plant data sources of an industrial plant, wherein the historical operation data comprises sensor data, environment data, laboratory data, design data and maintenance activity data and (ii) monitoring data;

pre-processing the historical operation data to obtain a pre-processed data;

estimating a soft-sensed data from the pre-processed data, by a plurality of soft sensor models associated with the industrial plant, wherein the soft sensor models comprise at least one of (i) a plurality of knowledge-based models (ii) a plurality of data driven models and (iii) a plurality of physics-based models;

combining the pre-processed data and the plurality of soft-sensed data to obtain an integrated data;

annotating the integrated data based on the maintenance activity data to obtain a plurality of subsets using a proximity rule based model, wherein the plurality of subsets comprises a high-confidence subset and a low-confidence subset;

computing a performance score corresponding to the high-confidence subset using a performance annotation model, wherein the performance annotation model comprises using at least one of (i) a rule based model and (ii) a physics-based model and wherein the performance score indicates a performance degradation state of the industrial plant;

annotating the high-confidence subset with the performance score;

training a degradation prediction model with the high-confidence subset annotated with the performance score, wherein the degradation prediction model comprises at least one of a first data-driven model and a first physics-informed machine learning model;

generating a performance score for the low-confidence subset from the degradation prediction model;

validating the performance score generated for the low-confidence subset using the degradation prediction model with the monitoring data;

training a prognosis model using the integrated data augmented with the validated performance score on the low-confidence subset and the high-confidence subset, wherein the prognosis model comprises a second data-driven model or a second physics-informed machine learning model; and building a diagnostic model using the integrated data augmented with the validated performance score on the low-confidence subset and the high-confidence subset and the prognosis model, wherein the diagnostic model comprises a third data-driven model.

8. The one or more non-transitory machine-readable information storage mediums of claim 7, wherein the sensor data comprises temperature, pressure, concentration flow rates pertaining to the industrial plant, the environment data comprises humidity, ambient temperature in the vicinity of the industrial plant, the design data comprises dimensions, materials pertaining to the industrial plant, the maintenance activity data comprises dates, duration, maintenance action pertaining to the industrial plant, the laboratory data comprises chemical composition, size distribution, material properties pertaining to the industrial plant, and the monitoring data comprises visual inspection, camera images or videos, periodic laboratory samples, special monitoring tools pertaining to the industrial plant, wherein the monitoring data may be intermittent.

9. The one or more non-transitory machine-readable information storage mediums of claim 7, wherein the one or more instructions which when executed by the one or more hardware processors further cause:

predicting an equipment performance degradation in the industrial plant using the prognosis model by performing the steps of, receiving a real-time operation data from the plurality of plant data sources of the industrial plant;

pre-processing the historical operation data and the real-time operation data to obtain a real-time pre-processed data;

estimating a real-time soft-sensed data from the real-time pre-processed data, by the plurality of soft sensors associated with the industrial plant;

combining the real-time pre-processed data and the real-time soft-sensed data to obtain a real-time integrated data;

predicting a performance score corresponding to the real-time integrated data using the degradation prediction model; and predicting a future state of degradation from the real time integrated data and the performance score corresponding to the real time integrated data using the prognosis model;

identifying a plurality of influential variables corresponding to the future state of degradation using the diagnostic model; and recommending a plurality of optimal setting for an optimal operation of the equipment using the plurality of influential variables.

* * * * *